United States Patent [19]
Foreman et al.

[11] Patent Number: 6,115,681
[45] Date of Patent: Sep. 5, 2000

[54] REAL-TIME DATA ACQUISITION

[75] Inventors: Carl R. Foreman, Rehoboth; Joseph B. Lopes, Seekonk, both of Mass.; Gerald R. Martel, Bristol, R.I.

[73] Assignee: The United States of America as represented by the Secretary of the Navy, Washington, D.C.

[21] Appl. No.: 08/992,070

[22] Filed: Dec. 17, 1997

[51] Int. Cl.[7] .................................................. G06F 15/46
[52] U.S. Cl. ........................ 702/188; 702/183; 370/415; 370/498
[58] Field of Search .................................. 702/188, 183; 370/498, 415

[56] References Cited

U.S. PATENT DOCUMENTS

| | | | |
|---|---|---|---|
| 4,234,926 | 11/1980 | Wallace et al. | 364/551 |
| 4,517,468 | 5/1985 | Kemper et al. | 290/52 |
| 4,707,823 | 11/1987 | Holdren et al. | 370/1 |

Primary Examiner—Marc S. Hoff
Assistant Examiner—Hien Vo
Attorney, Agent, or Firm—Michael J. McGowan; Robert W. Gauthier; Prithvi C. Lall

[57] ABSTRACT

A real-time data acquisition system for a remote, unmanned underwater vehicle includes an array of sensors within the vehicle which gather data from the environment surrounding the vehicle. The sensor data is digitized and stored in an imbedded computer on the unmanned vehicle. To display the data, the imbedded computer transfers the digital data over a local area network connection to a second computer aboard a mother ship. The second computer converts the digital data back to analog data for display. The data can also be analyzed and processed depending on test requirements. To test the unmanned vehicle performance, the vehicle can be operated adjacent the mother ship with the local area network connection in place. In this mode, the imbedded computer transfers the digital data to the second computer as the data is being stored in the imbedded computer.

12 Claims, 2 Drawing Sheets

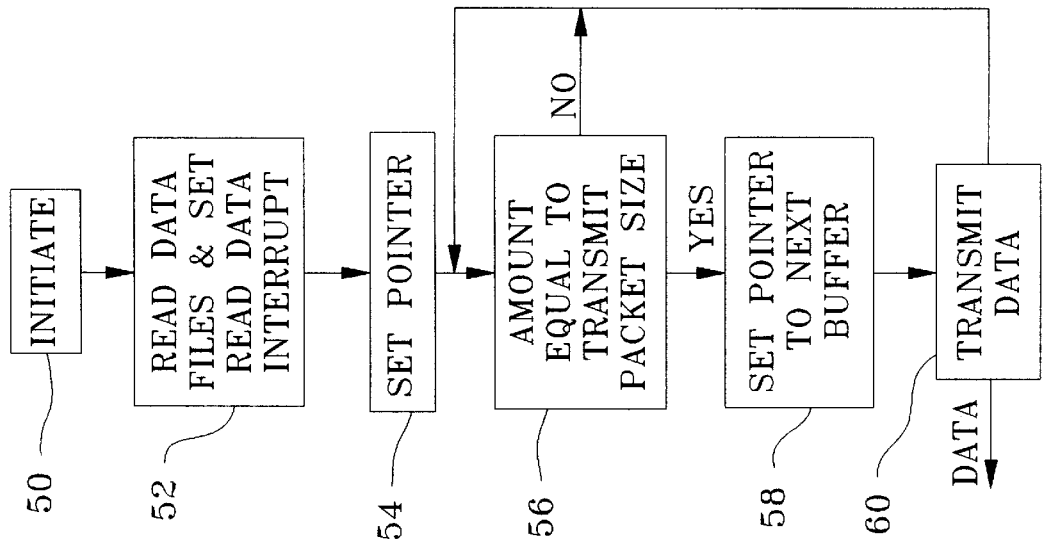
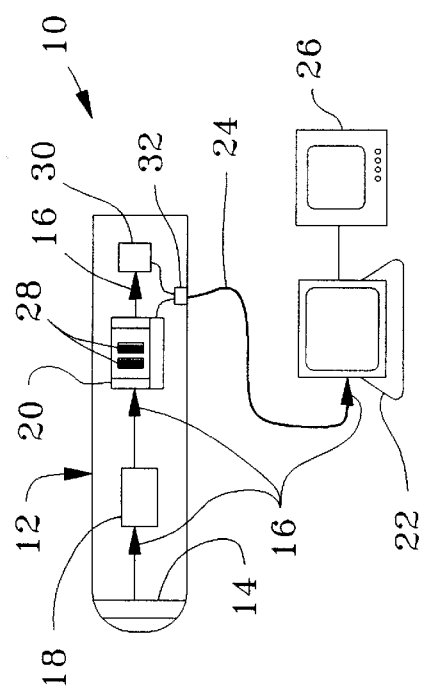
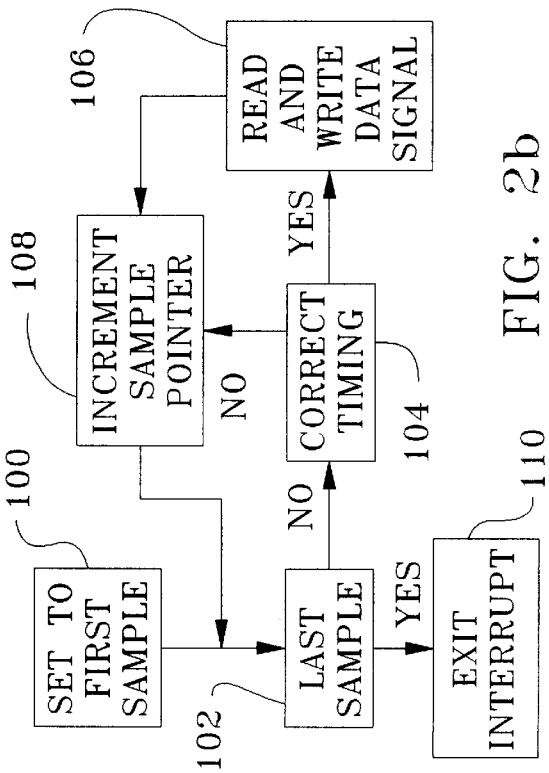

REAL-TIME DATA ACQUISITION

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

1. Field of the Invention

The present invention relates generally to data collection and transmission, and more particularly to collecting data from an array of sensors aboard an unmanned vehicle, digitizing the data for transmission over a local area network and displaying the data at a site remote from the vehicle.

2. Description of the Prior Art

There are many well known applications wherein analog data is collected from sensors, converted to digital signals, stored in a memory and then displayed. For example, U.S. Pat. No. 4,104,609 to Minegishi et al. recites a fish-finder which emits ultrasonic pulses into the water, receives the reflected waves, converts the reflected waves into digital signals, writes the digital signals into a main memory and reads out the digital signals for display on a color display. U.S. Pat. No. 5,047,990 to Gafos et al. recites an acoustic data acquisition system for shipboard use that allows for underwater acoustic data measurements at preselected submerged marine structural coordinates using a tethered, remotely operated vehicle (ROV). A fiber optic link is provided in the tether for conducting data signals from an acoustical transducer array located on the ROV to the mother ship. In order to display the sensor data, such systems as the Minegishi et al. fish-finder and the Gafos et al. system utilize memory buffering/reading schemes for transferring the data to a main memory prior to display. Such schemes are also known in the art. U.S. Pat. No. 5,099,458 to Takaki discloses a system in which sensor data is written into the transmission side of a memory. The data is then read out at constant periods using read and write address counters to point to, read, or write address positions in memory. Similarly, U.S. Pat. No. 5,128,931 to Yamanaka et al. recites a data exchange apparatus having common buffer memories for temporarily storing input data, a vacant buffer selector, i.e., pointer, for selecting a vacant buffer and memory locations to store the buffer identification numbers. The buffer memories operate independently to allow reading and writing to be carried out independently.

In certain applications, it is necessary for an unmanned vehicle to act independently, i.e. untethered, and at a considerable distance from the main, or mother ship. Unlike the Minegishi et al. fish-finder and the Gafos et al. system, the data acquisition system for such applications must be capable of processing and storing the sensor data aboard the unmanned vehicle for later transfer to the mother ship for display. Additionally, it may be necessary to provide real-time data for display in order to monitor the performance of the unmanned vehicle. None of the prior art data collection systems or data storage and retrieval methods can provide for both of these possibilities.

SUMMARY OF THE INVENTION

Accordingly, it is an object of the present invention to provide a capable of storing sensor data aboard a remote, unmanned vehicle for later display.

Another object of the present invention is to provide a real-time data acquisition system for displaying real-time sensor data transmitted from a remote, unmanned vehicle.

Other objects and advantages of the present invention will become more obvious hereinafter in the specification and drawings.

In accordance with the present invention, a real-time data acquisition system is provided for a remote, unmanned underwater vehicle. The system includes an array of sensors within the vehicle which gather data from the environment surrounding the vehicle. Any analog sensor data is converted to digital data. The digital data is stored within an imbedded computer located aboard the unmanned vehicle. When the data is to be displayed, the imbedded computer transfers the digital data over a local area network connection, e.g., an Arcnet connection, to a second computer aboard a mother ship. The second computer converts the digital data back to analog data for display. The data can also be analyzed and processed depending on test requirements. To test the unmanned vehicle performance, the vehicle can be operated adjacent the mother ship with the network connection in place. In this mode, the imbedded computer transfers the digital data to the second computer as the data is being stored in the imbedded computer. The imbedded computer allows storage of digital sensor data until such time as the unmanned vehicle is reconnected to the mother ship via a network connection. When the removable network connection is in place, the unmanned vehicle can be run tethered to the mother ship, allowing for real-time sensor data transfer and display.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein:

FIG. 1 is a schematic representation of the real-time data acquisition system of the present invention;

FIG. 2a is a flow chart showing the steps implementing the data transmission of the real-time data acquisition system of the present invention; and FIG. 2b is a flow chart showing the READ DATA interrupt for the real-time data acquisition system of the present invention.

DESCRIPTION OF THE PREFERRED EMBODIMENT

Figure 2C:
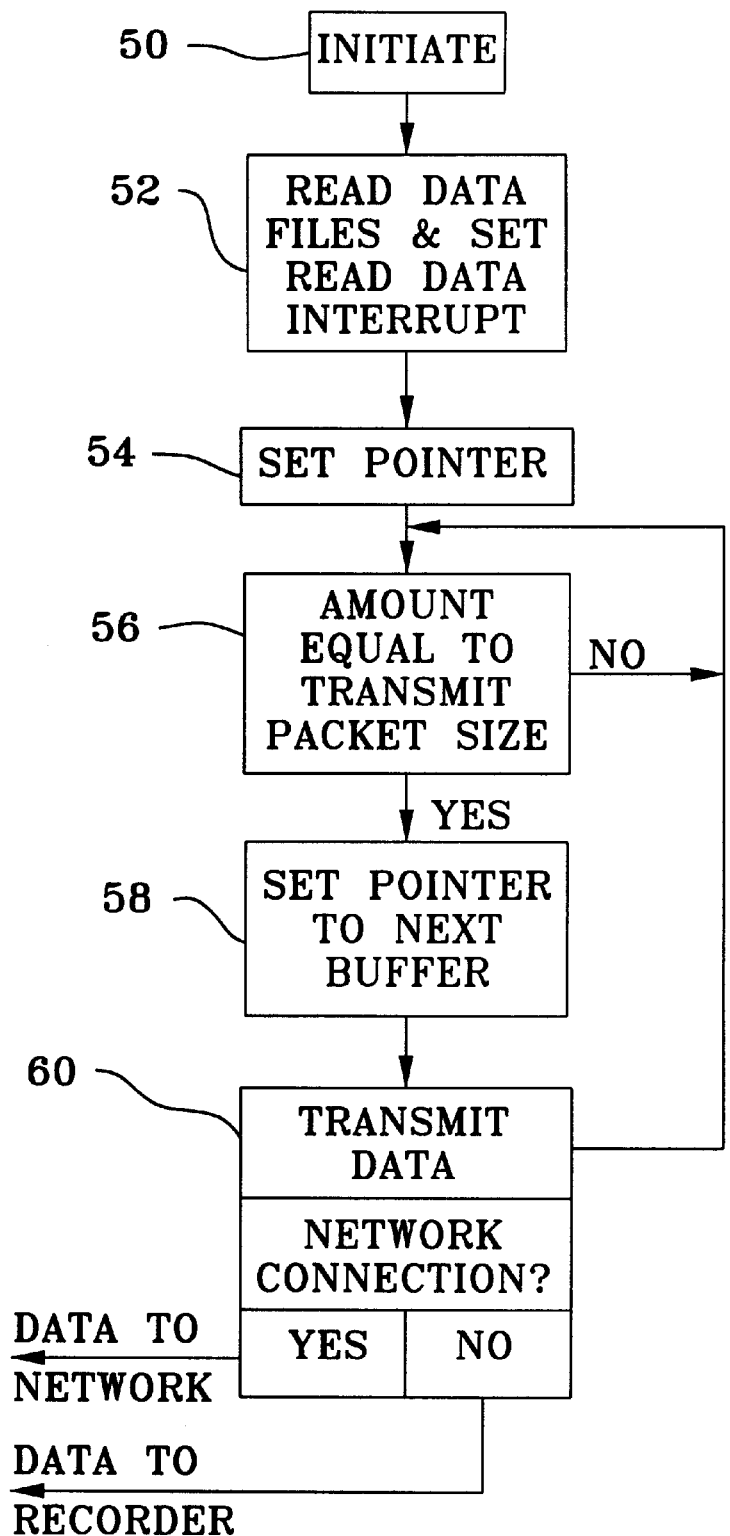
FIG. 2c is a flow chart showing the READ DATA interrupt for a second embodiment of the real-time data acquisition system of the present invention.

Referring now to FIG. 1, there is shown a schematic representation of real-time data acquisition system 10. An unmanned underwater vehicle 12 has an array of sensors 14 which gather data from the environment surrounding vehicle 12. Sensors 14 send either digital or analog data signals (shown by arrows 16) to interface 18. Depending on the configuration of the sensors, data signals 16 can be digital, analog, or a combination of both. Interface 18 prepares signals 16 for input into internal computer 20 by setting the signals to the proper voltage differentials for use in internal computer 20. If a signal is analog, interface 18 first converts the analog signal to a digital signal. The configuration and operation of interface 18 may correspond to any well known analog to digital converter and signal processor. In the preferred embodiment, internal computer 20 is connected to external computer 22 via network connection 24. Internal computer 20 sends data signals 16 to external computer 22 via connection 24. External computer 22 prepares data signals 16 for further analysis and processing and for viewing on display 26.

Referring now to FIG. 2a, a flow chart is shown illustrating the processing of the data signals from sensors 16 to external computer 22 and display 26. Prior to operation, a user would load internal computer 20 with data files 28 containing sensor 14 parameters, such as sampling rates. Step 50 initializes the system, powering up the sensors 14, interface 18, computers 20 and 22 and display 26 and performing internal checks to verify operation of the system. Step 52 reads data files 28 and sets a READ DATA interrupt based on the highest sampling rate. Step 54 sets a memory write pointer to a first buffer in computer 20. Step 56 continually compares the amount of data sampled against a preselected transmit packet size. When the amount of data sampled is equal to the transmit packet size, step 58 changes the memory write pointer to the next buffer. Step 60 then transmits the data in the first buffer to external computer 22 via network connection 24 and loops back to step 56 to check if additional data is ready for transmission.

Referring now to FIG. 2b, there is shown a flow chart of the READ DATA interrupt. On interrupt, control is transferred from the data transmission flow chart of FIG. 2a to the READ DATA interrupt of FIG. 2b. Step 100 sets the data sample point to the first sample. The sequence of data samples from sensors 14 is determined from data files 28. Step 102 checks to see if the data sample point is the last data sample. If not, step 104 checks if the timing is correct, based on the sampling rate in data files 28, to obtain a data sample. If the timing is correct, step 106 obtains a data signal from interface 18 and writes the data signal to the buffer corresponding to memory pointer of FIG. 2a. Step 108 increments the sample pointer to the next sample and returns to step 102. If the sample was the last sample, step 102 transfers to step 110 to exit the READ DATA interrupt. If at step 104, the timing was not correct, step 104 branches to step 108 to increment the sample pointer.

When data is transmitted from internal computer 20 via network connection 24, external computer 22 reads and stores the data in memory. The configuration and operation of external computer 22 may conform to any well known data processing and display architecture.

The invention thus described is a real-time data acquisition system which obtains data from an array of sensors aboard an unmanned underwater vehicle. An interface prepares the data for storage in a computer memory aboard the vehicle, digitizing any analog data signals from the sensors. To display the data, the imbedded computer transfers the digital data over a network connection to a second computer aboard a mother ship. The second computer converts the digital data back to analog data for display.

Although the present invention has been described relative to a specific embodiment thereof, it is not so limited. For example, when unmanned vehicle 12 is not connected to a mother ship, the data may be stored in recorder 30 aboard vehicle 12. In this embodiment shown in FIG. 2c, step 60 of FIG. 2a would first check to determine if network connection 24 is in operation and, if not, transfer the data to recorder 30. When network connection 24 is again operating, recorder 30 transfers the data to external computer 22 via network connection 24 and intermediate connection 32. With network connection 24 operating, step 60 performs as previously described, transmitting the data directly to external computer 22 over network connection 24.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A real-time data acquisition system for obtaining real-time data from a sensor array aboard an unmanned vehicle, the system comprising:

an interface receiving data signals from the array, processing the data signals and outputting digital signals;

an internal computer aboard the vehicle receiving the digital signals, storing the digital signals as transmit packets and outputting the transmit packets;

a removable network connection receiving the transmit packets at a first end of the network connection and outputting the transmit packets at a second end of the network connection remote from the vehicle;

an external computer connected to the second end of the network connection, the external computer receiving the transmit packets, storing the transmit packets for processing by a user and outputting the transmit packets as display data; and a display receiving the display data and displaying the display data for viewing by the user in a time frame corresponding to the real-time sensor data.

2. The real-time data acquisition system of claim 1 further comprising a recorder receiving the transmit packets from the internal computer, storing the transmit packets and outputting the transmit packets to the network connection when the network connection is attached to the recorder.

3. The real-time data acquisition system of claim 1 wherein the interface further comprises an analog to digital converter for converting analog data signals to digital data signals.

4. The real-time data acquisition system of claim 2 wherein the interface further comprises an analog to digital converter for converting analog data signals to digital data signals.

5. The real-time data acquisition system of claim 1 wherein the internal computer further comprises data files containing sensor parameters, the internal computer determining a data sampling rate for the sensor array from the sensor parameters.

6. The real-time data acquisition system of claim 2 wherein the network connection further comprises an intermediate connection connected between the network connection and the internal computer, the intermediate connection being further connected between the network connection and the recorder, the system sensing a presence and absence of the network connection, the system routing the real-time data to the network connection via the intermediate connection when the presence of the network connection is sensed, the system routing the real-time data to the recorder via the intermediate connection when the absence of the network connection is sensed.

7. A method of acquiring real-time data from an array of sensors aboard an unmanned vehicle and transmitting the real-time data to a site remote from the vehicle for display and processing of the data, the method comprising the steps of:

setting a memory pointer to an input buffer located within a computer aboard the vehicle;

inputting data from the array of sensors into a memory location specified by the memory pointer;

determining if the amount of data in the memory location corresponds to a predetermined transmit packet size;

testing for a network connection;

transmitting the data in the memory location to the remote site via a network connection when the amount of data corresponds to the predetermined transmit packet size and when the network connection is present and returning to the input data step;

transmitting the data in the memory location to a recorder aboard the unmanned vehicle when the amount of data corresponds to the predetermined transmit packet size and when the network connection is not present and returning to the input data step; and returning to the input data step when the amount of data does not correspond to the predetermined transmit packet size.

8. The method of claim 7 wherein the transmit data step further comprises:

setting the memory pointer to a next buffer; and changing the input buffer to the next buffer.

9. The method of claim 7 wherein the input data step further comprises:

reading a data file stored in the computer, the data file containing rates of sensor sampling intervals;

determining a READ DATA interrupt sequence timing from the sensor sampling interval rates; and obtaining data from one of the sensors of the sensor array at a time interval corresponding to the READ DATA interrupt sequence timing.

10. The method of claim 9 wherein the obtain data step further comprises the steps of:

determining if the time interval corresponds to the sampling interval for the one sensor;

reading the data from the one sensor and making the data available for input to the memory location when the time interval corresponds to the sampling rate; and incrementing the sampling interval.

11. The method of claim 10 wherein, prior to the determine the time interval step, the obtain data step further comprises:

setting the sampling interval to a first sampling interval;

determining if the sample interval is a last sample interval; and exiting the obtain data step when the sample interval is the last sample interval.

12. A real-time data acquisition system for obtaining real-time data from a sensor array aboard an unmanned vehicle, the system comprising:

an interface receiving data signals from the array, processing the data signals and outputting digital signals;

an internal computer aboard the vehicle receiving the digital signals, storing the digital signals as transmit packets and outputting the transmit packets;

a removable network connection receiving the transmit packets at a first end of the network connection and outputting the transmit packets at a second end of the network connection remote from the vehicle;

a recorder for receiving the transmit packets from the internal computer and storing the transmit packets for later transmission of the transmit packets to the network connection;

an intermediate connection, the system routing the real-time data to the network connection via the intermediate connection when the system senses the presence of the network connection, the system routing the real-time data to the recorder via the intermediate connection when the system senses the absence of the network connection.

* * * * *